United States Patent

DeBaratolo, Jr. et al.

[11] Patent Number: 5,300,731
[45] Date of Patent: Apr. 5, 1994

[54] CONDUIT ADAPTER ASSEMBLY

[75] Inventors: Joseph V. DeBaratolo, Jr., North Stonington; Gust J. Wuorinen, Ledyard, both of Conn.

[73] Assignee: Hubbell Incorporated, Orange, Conn.

[21] Appl. No.: 862,063

[22] Filed: Apr. 2, 1992

[51] Int. Cl.$^5$ ............................................. H02G 3/04
[52] U.S. Cl. .................... 174/48; 174/65 R; 174/72 C
[58] Field of Search ............... 174/48, 49, 50, 65 R, 174/71 R, 72 R, 72 C, 88 R; 220/3.92, 3.94; 285/156, 907

[56] References Cited

U.S. PATENT DOCUMENTS

| | | | |
|---|---|---|---|
| 832,508 | 10/1906 | Slocum | 220/3.94 |
| 917,328 | 4/1909 | Lutz . | |
| 1,986,965 | 1/1935 | Frank | 247/3 |
| 2,119,319 | 5/1938 | D'Esopo | 285/156 |
| 2,133,706 | 10/1938 | LaDucer | 285/156 X |
| 2,620,081 | 12/1952 | Lear, Jr. | 220/3.94 |
| 3,023,032 | 2/1962 | Johnston et al. | 285/156 X |
| 4,602,124 | 7/1986 | Santucci | 174/101 |
| 4,649,230 | 3/1987 | Nielson | 174/65 R |
| 4,907,767 | 3/1990 | Corsi et al. | 248/49 |
| 4,942,271 | 7/1990 | Corsi et al. | 174/101 |

FOREIGN PATENT DOCUMENTS 235411  9/1961  Australia .

Primary Examiner—Leo P. Picard
Assistant Examiner—David Tone
Attorney, Agent, or Firm—Jerry M. Presson; David L. Tarnoff

[57] ABSTRACT

A conduit adapter assembly for a surface mounted duct system. The conduit adapter assembly includes a base adapted to be attached to a surface of a wall, and a cover which snap fits onto the base. The base has punch-outs to provide access to the interior of the conduit adapter assembly for feeding a conduit therein. Twist-out portions are provided in the cover to receive surface-mounted ducts or raceways which are mounted on the ceiling. An end wall of the cover is provided with an opening to receive a run of duct or raceway of a particular size which is mounted on the wall. The end wall is detachable from the rest of the cover to form a larger opening for receiving a larger size duct or raceway.

39 Claims, 5 Drawing Sheets

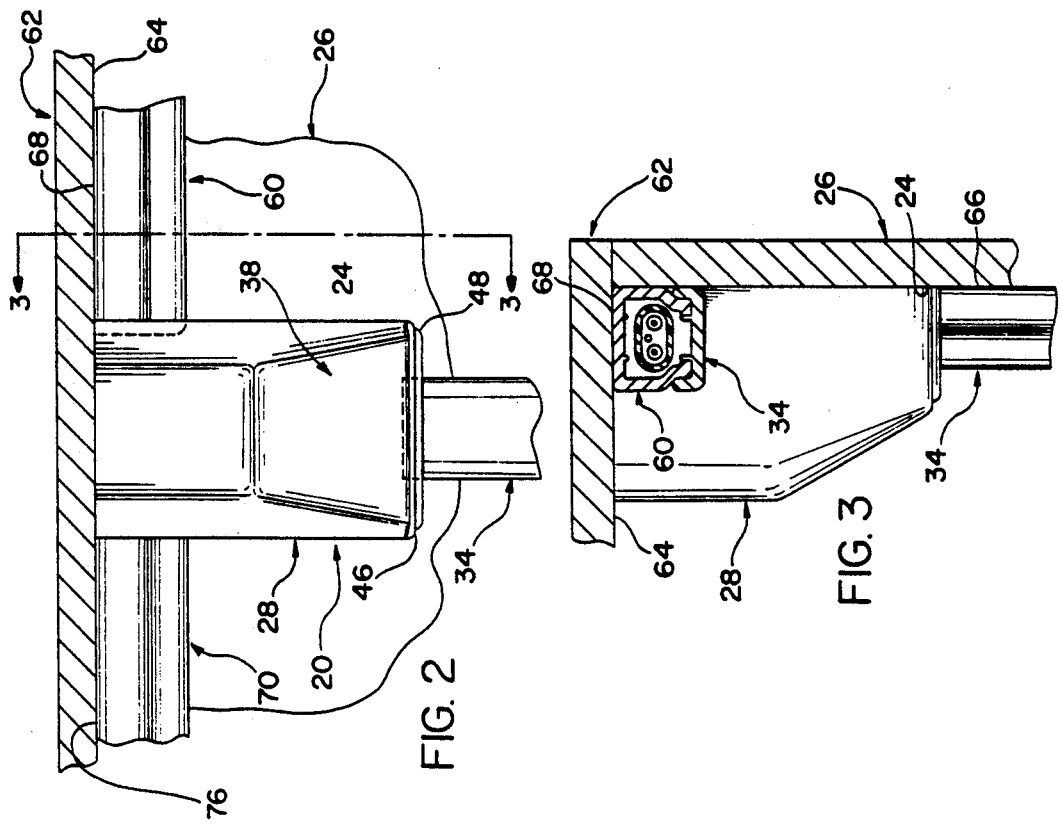
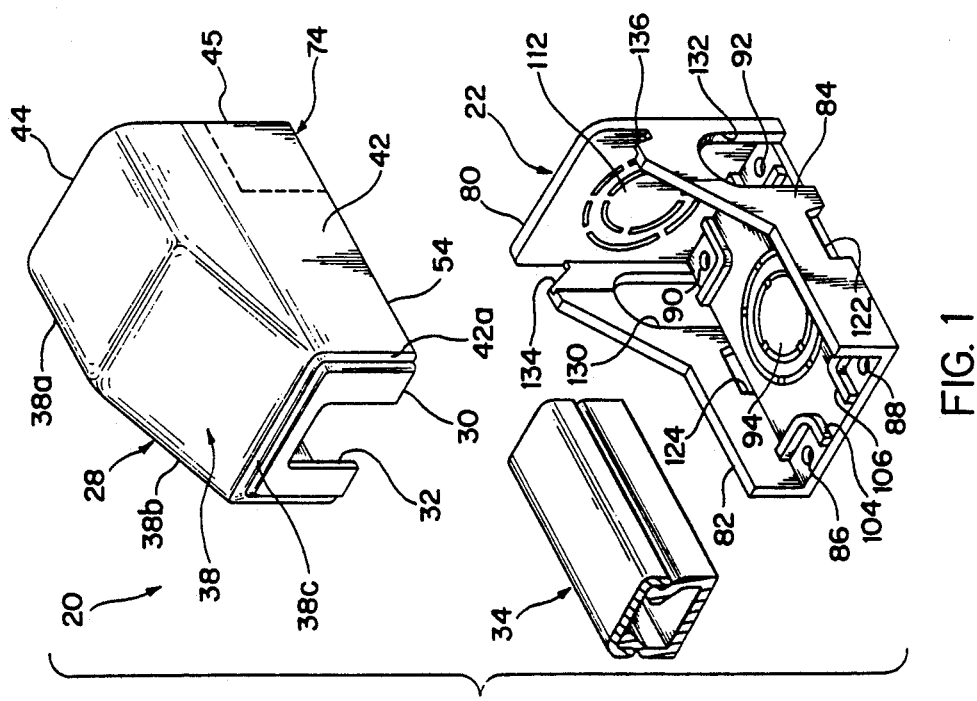

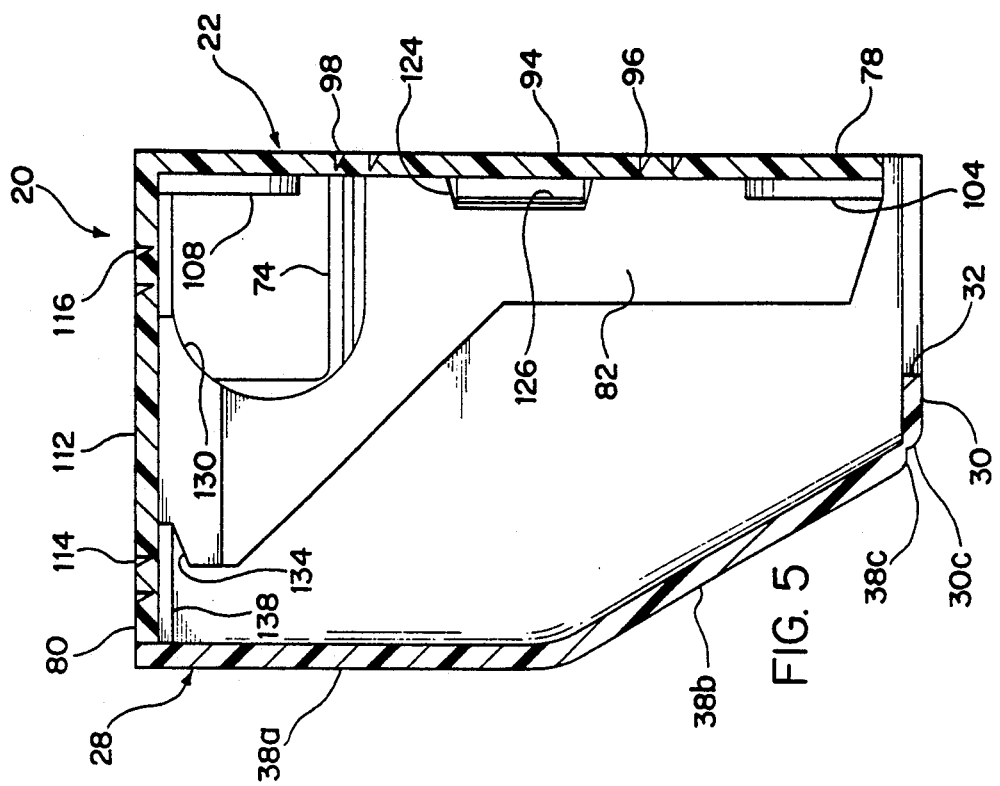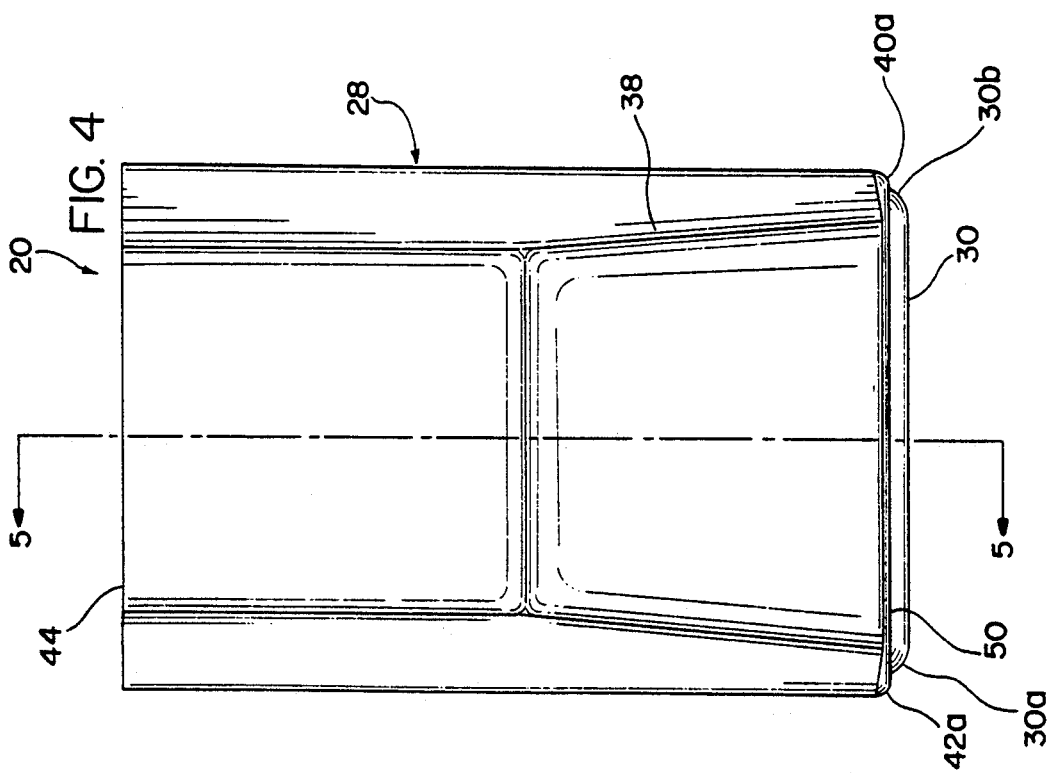

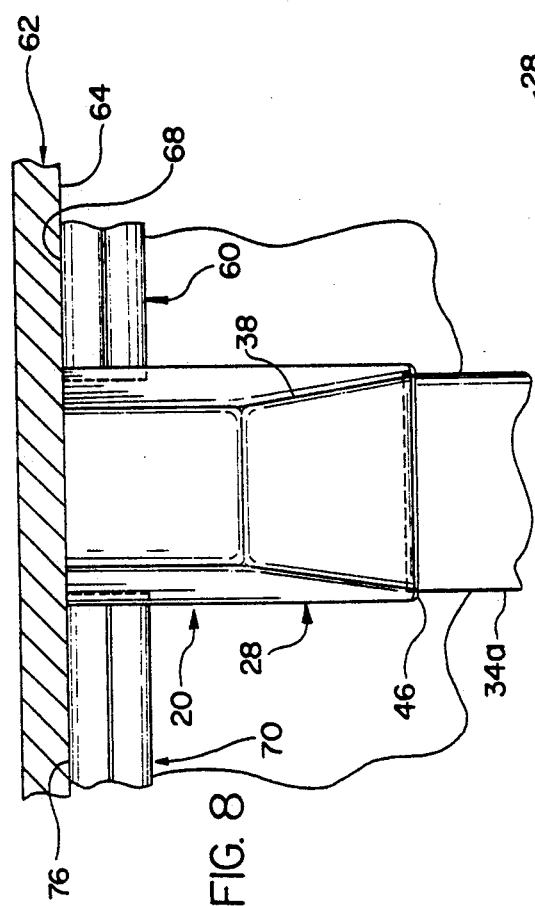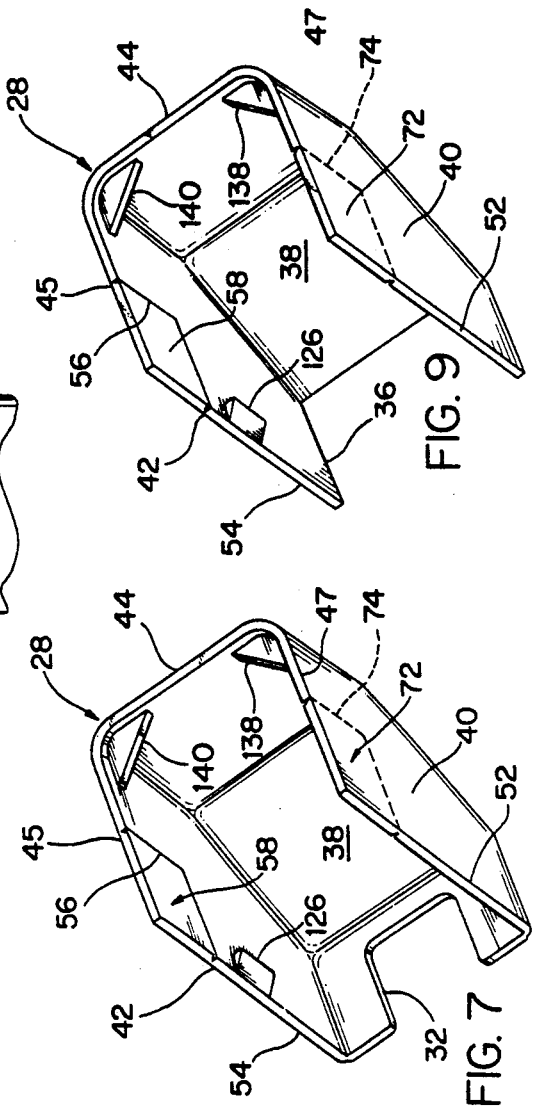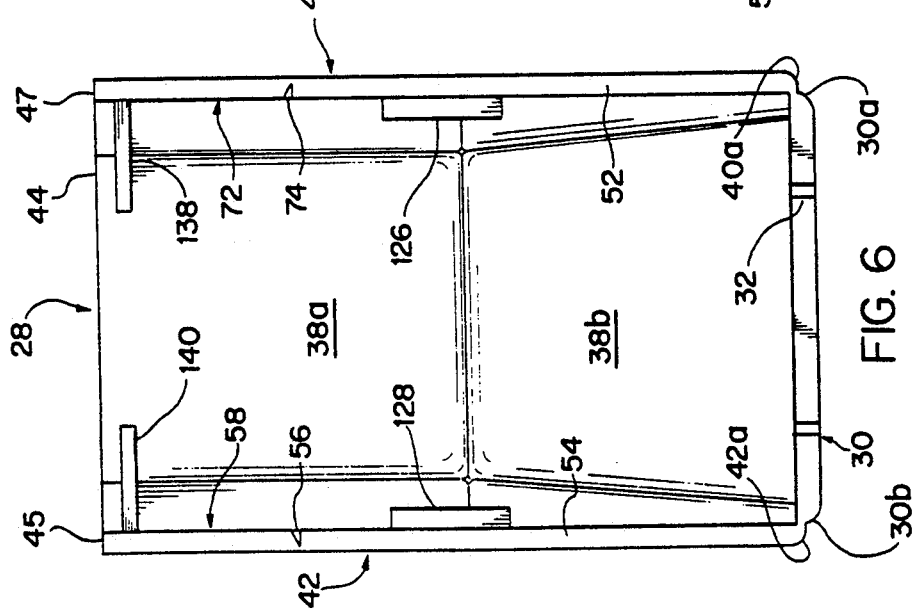

CONDUIT ADAPTER ASSEMBLY

FIELD OF THE INVENTION

The present invention relates to a conduit adapter assembly for introducing a conduit, electrical wiring or the like into a duct or raceway of a surface mounted duct system. More specifically, the invention relates to a conduit adapter assembly having a base and a cover detachably coupled to each other by snap-fitting complementary parts. A plurality of punch-outs are provided in various walls of the base and cover. Depending on which one or combination of punch-outs are removed, a variety of different junctions can be formed between different runs of raceway.

BACKGROUND OF THE INVENTION

Surface mounted duct systems for enclosing conduit, electrical wiring and the like are known. A typical duct system includes a plurality of raceway runs, some of which are joined at various locations by junction enclosures. The precise configuration of each duct system, including the raceway sizes, lengths and locations, and the number and type of junction enclosures, is determined by site-specific wiring layout. Sometimes, one or more junction enclosures are used to introduce the conduit into one of the raceway runs of the duct system.

Enclosures serving as junctions and/or conduit adapters must cooperate with their corresponding raceways to completely conceal and protect the conduit running therethrough. At the same time, the enclosures and raceways must present an aesthetically pleasing appearance since the entire duct system is typically mounted on an exposed surface. To maintain an aesthetically pleasing appearance, duct systems have employed tight-fitting connections between raceways and junction enclosures. Moreover, junction enclosures of the prior art have a single, specific configuration, such as a left elbow, right elbow or T-joint.

Since the prior art enclosures are limited to a specific configuration, and for use with a raceway of a particular size, an installer is usually required to carry several different types of conduit adapters and/or junctions when installing the duct system. This complicates the installation procedure for the duct system.

Another drawback associated with prior art raceway junctions is that they are not capable of joining two runs of raceways mounted on different planes, such as where one is mounted on a ceiling while the other run is mounted on a wall.

Examples of prior art raceways and junctions include U.S. Pat. No. 917,328 to Lutz; U.S. Pat. No. 1,986,965 to Frank; U.S. Pat. No. 4,602,124 to Santucci; U.S. Pat. No. 4,649,230 to Nielsen; U.S. Pat. No. 4,942,271 to Corsi et al; and U.S. Pat. No. 4,907,769 to Corsi et al.

Thus, there exists a need to provide an improved conduit adapter assembly which can be used for a various type of connections, and has an aesthetically pleasing appearance. This invention addresses these needs in the art, along with other needs which will become apparent to those skilled in the art once given this disclosure.

SUMMARY OF THE INVENTION

Accordingly, a primary object of the present invention is to provide a conduit adapter assembly capable of introducing a conduit into a raceway of a duct system.

Another object of the present invention is to provide a conduit adapter assembly capable of forming a junction between different runs of raceway or duct.

Another object of the present invention is to provide a conduit adapter assembly capable of forming a "twisted" junction between two different runs of duct or raceway, where each run is mounted on a different surface lying in a different plane.

Another object of the present invention is to provide a conduit adapter assembly capable of forming different types of junctions between two or more runs of raceway or duct.

Still another object of the present invention is to provide a conduit adapter for a duct or raceway system in which an overall aesthetically pleasing appearance is maintained while completely concealing and protecting the conduits disposed therein.

Yet another object of the present invention is to provide an enclosure for a duct system that is relatively simple in construction and cost effective to produce.

The foregoing objects are basically attained by a conduit adapter assembly, the combination comprising: a base having a rear wall adapted to be fixedly coupled to a first mounting surface and located adjacent a second mounting surface non-coplanar to the first mounting surface; a cover adapted to be coupled to the base; and coupling members associated with the cover and the base for coupling the cover to the base to form an enclosure having first and second opposite ends with a pair of opposite sides extending between the first and second opposite ends, the second end of the enclosure having a first opening lying in a plane substantially perpendicular to the first mounting surface, and the first opening being positioned adjacent the first mounting surface to receive at least one conduit from a first duct mounted on the first mounting surface, at least one of the pair of opposite sides having a punch-out for selectively defining a second opening lying in a plane substantially perpendicular to the plane of the first opening, the second opening being positioned adjacent the second mounting surface to receive at least one conduit from a second duct mounted on the second mounting surface.

The foregoing objects are also attained by a conduit adapter assembly, the combination comprising: a base attachable to a first surface; a cover detachably coupled to the base to form an enclosure; a first opening formed in one of the base and the cover to receive at least one conduit from a first run of duct mounted on the first surface; and a punch-out formed in one of the base and cover for receiving at least a second run of duct mounted on a second surface non-coplanar with the first surface.

The foregoing objects are further attained by a conduit adapter assembly, the combination comprising: a base having a rear wall adapted to be fixedly coupled to a first mounting surface and adjacent a second mounting surface non-coplanar to the first surface; a cover adapted to be coupled to the base, the cover including a front wall with a pair of side edges and a pair of end edges, a pair of substantially parallel side walls having a pair of end edges and a pair of side edges with one of the side edges of each of the side walls being coupled to and extending from one of the side edges of the front wall, and an end wall coupled to one of the end edges of the front wall and one of the edges of each of the side walls, at least one of the side walls having a frangible seam extending between its other side edge and its other end edge for selectively removing a corner formed by the other side and end edges to receive at least one conduit from a duct mounted on one of the mounting surface; and coupling members associated with the cover and the base, for coupling the cover to the base to form an enclosure.

The foregoing objects are further attained by a conduit adapter assembly, the combination comprising: a base adapted to be fixedly coupled to a first surface and adjacent a second surface non-coplanar to the first surface; a cover adapted to be coupled to the base, the cover including a front wall with a pair of side edges and a pair of end edges, a pair of substantially parallel side walls having a pair of end edges and a pair of side edges with one of the side edges of each of the side walls coupled to and extending from one of the side edges of the front wall, and an end wall with frangible seam for detachable coupling the end wall to one of the end edges of the front wall and one of the end edges of each of the side walls, the end wall having a first opening therein and coupling members associated with the cover and the base for coupling the cover to the base to form an enclosure having first and second opposite ends and a pair of opposite side walls extending between the first and second opposite ends.

One or both of two opposite side walls of the cover may be provided with twist-outs which facilitate the formation of left-handed or right-handed elbow junctions, with one twist-out removed, or a T-junction with both twist-outs removed.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings which form a part of this original disclosure:

FIG. 1 is an exploded, front, right perspective view of a conduit adapter assembly according to a preferred embodiment of the present invention together with a portion of a first duct;

FIG. 2 is a front elevational view of the conduit adapter assembly of FIG. 1, attached to a vertical wall surface in a corner formed by the vertical wall and a horizontal ceiling surface, and further showing portions of first, second and third ducts converging in the conduit adapter assembly to form a T-junction;

FIG. 3 is a side cross-sectional view taken along line 3—3 of FIG. 2;

FIG. 4 is an enlarged, front elevational view of a conduit adapter assembly according to a preferred embodiment of the present invention;

FIG. 5 is a side elevational view in vertical cross-sectional taken along line 5—5 of FIG. 4;

FIG. 6 is an enlarged, rear elevational view of the cover of the conduit adapter assembly of FIG. 1;

FIG. 7 is a rear perspective view of the cover of FIG. 6;

FIG. 8 is a front elevational view similar to FIG. 2, except that the detachable end wall of the cover has been removed and the first duct has been replaced with a larger sized duct;

FIG. 9 is a rear perspective view of the cover of FIGS. 6-8 with the detachable end wall removed;

DETAILED DESCRIPTION OF THE INVENTION

Figure 12:
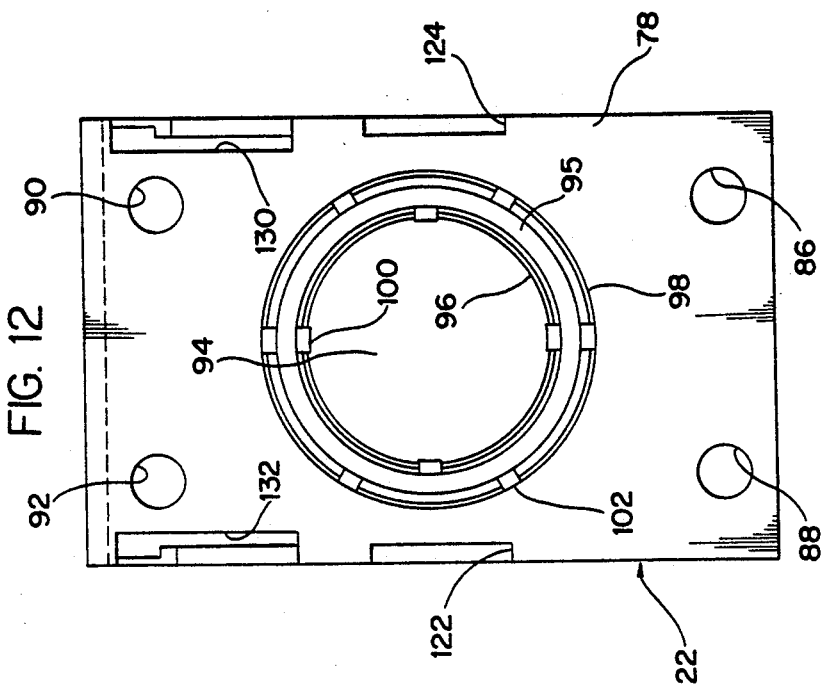
FIG. 12 is an enlarged, rear elevational view of the base of the conduit adapter assembly of FIG. 1.

Referring initially to FIGS. 1-5, a conduit adapter assembly 20 is illustrated in accordance with the present invention, and includes a base 22 attachable to a surface 24 of a vertical wall 26, and a cover 28 releasably coupled to base 22. The cover 28 and base 22 are preferably made of a plastic material via molding.

As particularly seen in FIGS. 1 and 4-7, cover 28 has a bottom, detachable end wall 30 with a substantially U-shaped opening 32 therein, a contoured front wall 38, and a pair of parallel side walls 40 and 42 coupled substantially perpendicularly to end wall 30 and front wall 38.

U-shaped opening 32 is dimensioned to snugly receive a first run of a surface mounted raceway or duct 34 therein. As seen in FIGS. 7, 8 and 9, upon removing detachable end wall 30, a second larger, substantially U-shaped opening 36 is formed at the end of the cover 28. The second opening 36 is dimensioned to snugly receive a larger size of a first run of a surface-mounted raceway or duct 34a therein, as seen in FIG. 8.

Front wall 38 has a first flat, vertical portion 38a and a second downwardly and inwardly sloping portion 38b, as particularly seen in FIGS. 1 and 3. The front wall 38 is integrally formed with two opposite side walls 40 and 42, as seen in FIGS. 6 and 7.

At one end of the cover 28, the contiguous end edges 44, 45 and 47 of the front wall 38 and side walls 40 and 42, respectively, are co-planar. At the opposite end, the contiguous edges 38c, 40a and 42a of the front wall 38 and side walls 40 and 42, respectively, are rounded convexly with respect to the outer surfaces of the cover 28. The detachable end wall 30, disposed at the same end, has rounded contiguous peripheral edges 30a, 30b and 30c which are also rounded convexly. Contiguous edges 30a, 30b and 30c of the end wall 30 converge inwardly with contiguous edges 38c, 40a and 42a of front wall 38 and side walls 40 and 42 to produce a frangible U-shaped seam 50.

Seam 50 is a stress riser constituting a thin bridge of material between the detachable end wall 30 and the ends of the front wall 38 and side walls 40 and 42. The end wall 30 can be molded integrally with the rest of cover 28 to form seam 50 by a straight draw molding operation, without using cams, lifters or side actions as typically required.

When separation of the end wall 30 from the cover 28 is desired, end wall 30 is pushed inwardly or pulled outwardly with force sufficient to break along seam 50. The frangible seam 50 breaks cleanly and flush to maintain the overall aesthetically pleasing appearance of the conduit adapter assembly 20. The convex rounding of the edges 30a, 30b, 30c, 38c, 40a and 42a help maintain the appearance of the cover 28 after punching out the end wall 30.

The cover 28 has two parallel rearward or side edges 52 and 54 along sidewalls 40 and 42, as seen in FIGS. 6, 7 and 9. Rearward edges 52 and 54 converge with end edges 47 and 45 of side walls 40 and 42, respectively, to form corners of the respective side walls 40 and 42.

As seen in FIGS. 6 and 9, a groove or seam 56 formed in the inner surface of the side wall 42 extends from the rearward edge 54 to the end edge 45. The groove 56 provides a frangible seam in the side wall 42 for removing a twist-out portion 58. The twist-out portion 58 can be optionally removed to receive a second run of a surface mounted raceway or duct 60, as seen in FIGS. 2–3.

Preferably, the conduit adapter assembly 20 is mounted in a corner formed by vertical wall 26 and a ceiling 62. Surface 64 of the ceiling 62 lies in a plane substantially perpendicular to the plane of surface 24 of the wall 26.

First duct 34 has a mounting surface 66 in contact with the surface 24 of the wall 26. Second duct 60 has its mounting surface 68 in contact with the surface 64 of the ceiling 62. Since the mounting surfaces 66 and 68 lay in different planes, a "twisted" junction is formed between the two ducts 34 and 60. Both ducts 34 and 60 can be mounted to their respective mounting surfaces using any conventional fastener.

As seen in FIGS. 6 and 9, a second twist-out portion 72 is defined by a groove or seam 74 formed in the inner surface of the side wall 40. Groove extends from the rearward edge 52 to the end edge 47. The groove 74 defines a frangible seam in the side wall 40 to form second twist-out portion 72. Removal of both twist-out portions 58 and 72 is initiated by bending the corners until a shearing stress fractures the material along the frangible seams 56 and 74.

The third run of raceway or duct 70 has the same configuration as the first and second ducts 34 and 60, respectively, and has a mounting surface 76 in contact with the surface 64 of the ceiling 62.

Ducts 34, 60 and 70 are conventional two-piece ducts which are well known, and thus ducts 34, 60 and 70 will not be discussed in detail.

With only first and second ducts 34 and 60 installed, the conduit adapter assembly 20 forms a right-handed elbow junction. To form a T-junction, a third run of a surface mounted raceway or duct 70 is coupled to conduit adapter assembly 20 by removing second twist-out portion 72 from side wall 40, and mounting third duct 70 on ceiling 62.

If a left-handed elbow junction is desired, the second duct 60 can be avoided and the twist-out 58 left undisturbed.

Since the grooves 56 and 74 are formed in the inner surfaces of respective side walls 42 and 40, a smooth outer surface with an aesthetically pleasing appearance of the conduit adapter assembly 20 can be maintained. Each of the grooves 56 and 74 is preferably V-shaped with the apex of each groove in proximity to the outer surface so that after fracture, a clean opening is formed. The openings formed by removal of the twist-out portions 58 and 72 are dimensioned to snugly receive the second and third runs of ducts 60 and 70 therein. In particular, the ends of ducts 60 and 70 extends through the openings formed in the cover 28 to abut against base 22.

Referring now to FIGS. 10–14, the base 22 includes a rear wall 78 adapted to be coupled to wall 26, an end wall 80 extending substantially perpendicular from the upper end of rear wall 78 to abut against ceiling 62, and a pair of parallel, opposite side walls 82 and 84 extending between and substantially perpendicular to rear wall 78 and end wall 80.

Rear wall 78 has first and second opposite ends with end wall 80 integrally formed at the upper end thereof and extending at a substantially right angle with respect thereto.

The rear wall 78 is a substantially flat, rectangular plate with four mounting openings 86, 88, 90 and 92, one located in each corner of rear wall 78. Mounting openings 86, 88, 90 and 92 receive mounting screws (not shown) or any other appropriate fastener for securing the base 22 to the wall 26, in a position as seen in FIGS. 2 and 3.

The pair of parallel opposite side walls 82 and 84 extend between the end wall 80 and the rear wall 78 so as to be mutually orthogonal therewith. The side walls 82 and 84 rigidize the base 22 by bracing the end wall 80 and rear wall 78. Although, side walls 82 and 84 of base 22 are preferably slightly resilient to permit flexing thereof during coupling of base 22 to cover 28 as discussed below.

A punch-out 94 is also provided in the rear wall 78 and is defined by two concentric circular grooves 96 and 98. A first series of frangible connector tabs 100 having a common radius connect the punch-out 94 to the rear wall 78. If the connector tabs 100 are fractured to remove punch-out 94, then a circular opening will be formed. After forming an access hole in the wall 26, a conduit connector (not shown) can then be coupled in the opening formed by removal of punch-out 94, and a conduit can be run into the conduit adapter assembly 20 from behind the wall 26.

Figure 13:
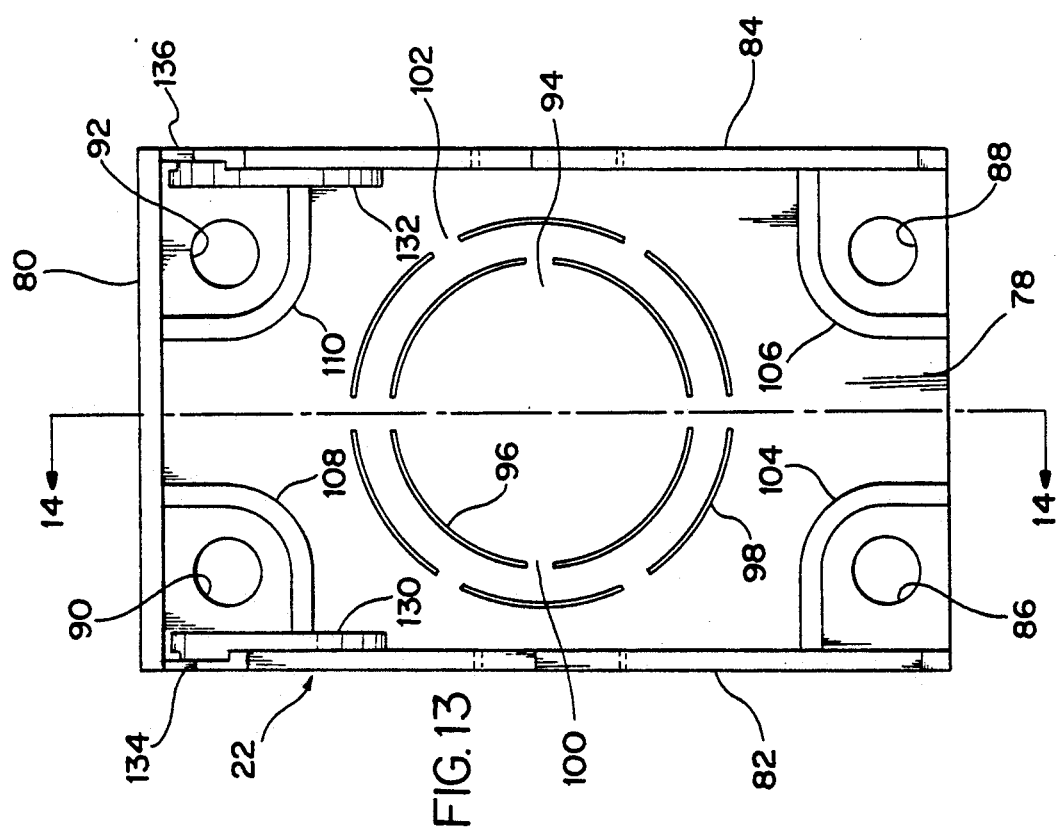
FIG. 13 is an enlarged, front elevational view of the base of the conduit adapter assembly of FIG. 1.

In order to accommodate a larger connector, a second series of frangible connector tabs 102, being on a common radius, can be fractured to remove a punch-out ring 95 which encircles punch-out 94. When the punch-out 94 and punch-out ring 95 are removed, a circular opening with a larger diameter will be formed. As shown in FIG. 13, the grooves 96 and 98 are discontinuous arcuate segments extending through rear wall 78 and interconnected by the tabs 100 and 102, respectively.

As best seen in FIG. 13, arcuate protrusions or ribs 104, 106, 108, and 110 are formed on the inner surface of the rear wall 78 to isolate and strengthen the region or corner of the rear wall 78 surrounding the holes 86, 88, 90 and 92.

Figure 10:
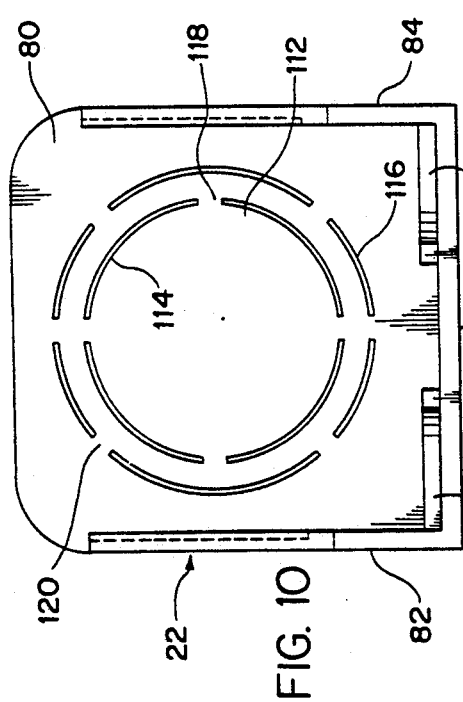
FIG. 10 is an enlarged, bottom end view of the base of the conduit adapter assembly of FIG. 1.
Figure 11:
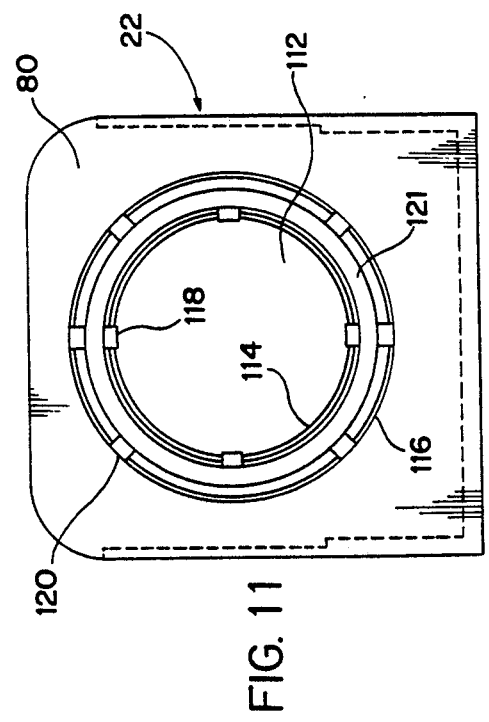
FIG. 11 is an enlarged, top end view of the base of the conduit adapter assembly of FIG. 10.
Figure 14:
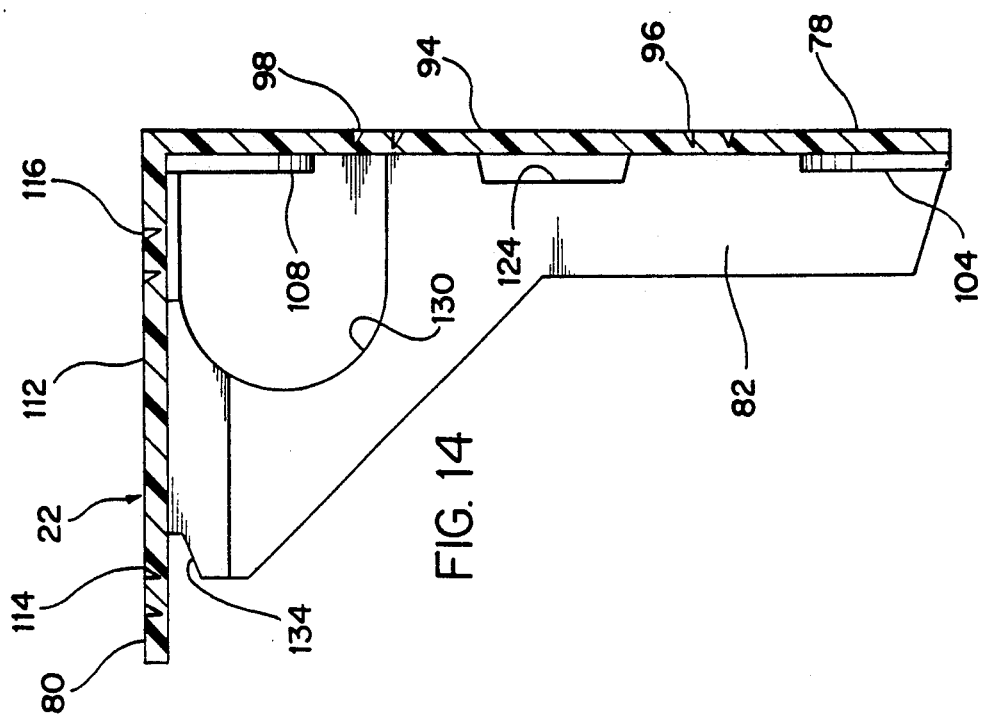
FIG. 14 is an enlarged, side elevational view, in vertical cross-section, taken along line 14—14 of FIG. 13.

As seen in FIGS. 10, 11 and 14, a second punch-out 112 is formed in the end wall 80 by two concentric circular grooves 114 and 116. The punch-out 112 is connected to the end wall 80 by a series of frangible tabs 118 formed on a common radius. When tabs 118 are fractured, a circular opening will be formed in the end wall 80 with a radius corresponding to the groove 114. A conduit connecter can then be fitted in the resulting opening to introduce electrical conduit, such as wiring, into the conduit adapter assembly 20.

A second series of frangible tabs 120 are located on a common radius which is greater than the radius of the first series of tabs 118. These can be fractured to remove a punch-out ring 121 and to produce an opening of larger diameter. As seen in FIG. 10, the grooves 114 and 116 constitute arcuate segments separated by the tabs 118 and 120, respectively.

As seen in FIGS. 1, 5, 12 and 14, the base 22 is further provided with rectangular openings 122 and 124 with coupling surfaces in respective side walls 82 and 84. Openings 122 and 124 receive catches 126 and 128 integrally formed on the inner surfaces of respective side walls 40 and 42 of the cover 28.

As seen in FIGS. 5-7, each of the catches 126 and 128 is wedge-shaped so that as the cover 28 is fitted on the base 22. Catches 126 and 128 slidably engage the side walls 82 and 84 of the base 22, causing the somewhat resilient side walls 40 and 42 of the cover 28 to spread radially outwardly. When the cover is in the assembled position, the catches 126 and 128 are received into the openings 122 and 124 via a snap-fit to detachably couple the cover 28 to the base 22. To separate the cover 28 from the base 22, the side walls 40 and 42 of the cover 28 are spread outwardly apart until the catches 126 and 128 disengage from openings 122 and 124 to permit cover 28 to be removed.

The side walls 82 and 84 of the base 22 are further provided with U-shaped openings 130 and 132, each being positioned behind the corresponding twist-out portions 58 and 72 of the cover 28 when cover 28 is coupled to base 22. When a twist-out portion 58 or 72 is removed to create an opening in the cover 28 for either of the second and third runs of ducts 60 or 70, then openings formed by removal of the twist-out portions 58 and 72 will be aligned with the openings 130 and 132 of the side walls 82 and 84 so that electrical wiring or conduits encased by ducts 60 and 70 can pass through side walls 40 and 42 into the interior of conduit adapter assembly 20.

The side walls 82 and 84 of the base 22 also include slots 134 and 136 which coact with diagonal members 138 and 140 to help guide the cover 28 into proper alignment with the base 22 during coupling of cover 28 thereto.

While an advantageous embodiment has been chosen to illustrate the invention, it will be understood by those skilled in the art that various changes and modifications can be made therein without departing from the scope of the invention as defined in the appended claims.

What is claimed is:

1. A conduit adapter assembly adapted to be coupled at an inside corner between a first mounting surface and a second mounting surface, the combination comprising:
    a base having a rear wall adapted to be fixedly coupled to a first mounting surface and located adjacent a second mounting surface non-coplanar to the first mounting surface;
    a cover adapted to be coupled to said base;
    at least two conduits with a first of said conduits having a first mounting portion being adapted to be fixedly coupled to the first mounting surface and a second of said conduits having a second mounting portion being adapted to be coupled to the second mounting surface non-coplanar to the first mounting surface; and
    coupling means, associated with said cover and said base, for coupling said cover to said base to form an enclosure having first and second opposite ends with a pair of opposite side walls extending between said first and second opposite ends, said opposite side walls having first end edges extending immediately adjacent and parallel to the second mounting surface,
    said first end of said enclosure having an end wall adapted to engage the second mounting surface, said rear wall being coplanar with said first mounting portion of said first conduit and said end wall being coplanar with said second mounting portion of said second conduit,
    said second end of said enclosure having means for defining a first opening lying in a plane substantially perpendicular to the first mounting surface, and said first opening being positioned immediately adjacent and communicating with the first mounting surface to receive said first conduit lying substantially flat on the first mounting surface, and
    at least one of said pair of opposite side walls having conduit receiving means for defining a second opening lying in a plane substantially perpendicular to the plane of said first opening, said second opening being positioned immediately adjacent the second mounting surface and communicating with one of said first end edges of one of said opposite side walls to receive said second conduit lying substantially flat on the second mounting surface.

2. A conduit adapter assembly according to claim 1, wherein
    said base includes a first end wall extending perpendicularly from one end of said rear wall to form said first end of said enclosure, and
    said cover includes a front wall extending between said first and second ends with said side walls being spaced apart and parallel to one another and extending perpendicularly from said front wall toward the first mounting surface, and said means for defining includes a second end wall extending between said two opposite side walls at said second end of said enclosure having said first opening extending therethrough.

3. A conduit adapter assembly according to claim 2, wherein
    said cover and said base being formed of a resilient plastic material.

4. A conduit adapter assembly, the combination comprising:
    a base having a rear wall adapted to be fixedly coupled to a first mounting surface and located adjacent a second mounting surface non-coplanar to the first mounting surface;
    a cover adapted to be coupled to said base; and
    coupling means, associated with said cover and said base, for coupling said cover to said base to form an enclosure having first and second opposite ends with a pair of opposite sides extending between said first and second opposite ends,
    said second end of said enclosure having means for defining a first opening lying in a plane substantially perpendicular to the first mounting surface, and said first opening being positioned adjacent the first mounting surface to receive at least one conduit from a first duct mounted on the first mounting surface,
    at least one of said pair of opposite sides having punch-out means for selectively defining a second opening lying in a plane substantially perpendicular to the plane of said first opening, said second opening being positioned adjacent the second mounting surface to receive at least one conduit from a second duct mounted on the second mounting surface,
    said rear wall has first and second ends, and a first end wall disposed at one of said first and second ends of said rear wall to form said first end of said enclosure,
    said cover including a front wall having first and second ends, two opposite side walls forming said sides of said enclosure, and an end wall extending between said two opposite side walls to form said second end of said enclosure, said cover and said base being formed of a resilient plastic material, and said end wall of said cover being detachable from said cover to form a second larger opening dimensioned to receive a larger size run of duct therein when detached.

5. A conduit adapter assembly according to claim 4, wherein said two opposite side walls and said front wall of said cover have contiguous rounded first end edges, and said detachable end wall has a rounded peripheral edge converging inwardly with said rounded first end edges of said front and side walls to form a first frangible seam between said detachable end wall and said cover.

6. A conduit adapter assembly according to claim 5, wherein said side walls and said front wall have contiguous second end edges, and said side walls have parallel rearward edges, said rearward edges and said second end edges of each of said side walls converge to form a corner.

7. A conduit adapter assembly according to claim 6, further comprising a second frangible seam disposed on one of said two opposite side walls of said cover, said second frangible seam extending between said rearward edge and said second end edge of said one of said side walls to define a first twist-out portion.

8. A conduit adapter assembly according to claim 7, further comprising a third frangible seam disposed on the other of said two opposite side walls of said cover, said third frangible seam extending between said rearward edge and said second end edge of said other of said side walls to define a second twist-out portion.

9. A conduit adapter assembly according to claim 6, further comprising second and third frangible seams disposed respectively on said two opposite side walls of said cover, each of said frangible seams extending between said rearward edge and said second end edge of said side walls to define respectively, first and second twist-out portions.

10. A conduit adapter assembly according to claim 9, wherein said two opposite side walls and said front wall have inner and outer surfaces, each of said second and third frangible seams being defined by a groove formed in said inner surface of said two opposite side walls, respectively.

11. A conduit adapter assembly according to claim 9, wherein said first twist-out is dimensioned to receive a second duct therein and to permit mounting of the second duct on the second mounting surface.

12. A conduit adapter assembly according to claim 11, wherein said second twist-out is dimensioned to receive a third duct therein and to permit mounting of the third duct on the second mounting surface.

13. A conduit adapter assembly, the combination comprising:

a base having a rear wall adapted to be fixedly coupled to a first mounting surface and located adjacent a second mounting surface non-coplanar to the first mounting surface;

a cover adapted to be coupled to said base; and coupling means, associated with said cover and said base, for coupling said cover to said base to form an enclosure having first and second opposite ends with a pair of opposite side walls extending between said first and second opposite ends, said opposite side walls having first end edges extending immediately adjacent and parallel to the second mounting surface, said second end of said enclosure having means for defining a first opening lying in a plane substantially perpendicular to the first mounting surface, and said first opening being positioned immediately adjacent and communicating with the first mounting surface to receive at least one conduit from a first duct lying substantially flat on the first mounting surface, and at least one of said pair of opposite side walls having conduit receiving means for defining a second opening lying in a plane substantially perpendicular to the plane of said first opening, said second opening being positioned immediately adjacent the second mounting surface and communicating with one of said first end edges of one of said opposite side walls to receive at least one conduit from a second duct lying substantially flat on the second mounting surface, said rear wall having first and second ends, an end wall disposed at one of said first and second ends of said rear wall to form said first end of said enclosure, and at least one punch-out formed in one of said rear and end walls.

14. A conduit adapter assembly according to claim 13, wherein said at least one punch-out comprises a first punch-out disposed in said rear wall and a second punch-out disposed in said end wall.

15. A conduit adapter assembly the combination comprising:

a base having a rear wall adapted to be fixedly coupled to a first mounting surface and located adjacent a second mounting surface non-coplanar to the first mounting surface;

a cover adapted to be coupled to said base; and coupling means, associated with said cover and said base, for coupling said cover to said base to form an enclosure having first and second opposite ends with a pair of opposite sides extending between said first and second opposite ends, said second end of said enclosure having means for defining a first opening lying in a plane substantially perpendicular to the first mounting surface, and said first opening being positioned adjacent the first mounting surface to receive at least one conduit from a first duct mounted on the first mounting surface, at least one of said pair of opposite sides having punch-out means for selectively defining a second opening lying in a plane substantially perpendicular to the plane of said first opening, said second opening being positioned adjacent the second mounting surface to receive at least one conduit from a second duct mounted on the second mounting surface, said cover having a front wall having first and second ends, and two opposite side walls, each of said side walls having inner and outer surfaces and two parallel rearward edges, said rear wall of said base having first and second ends, an end wall disposed at the first end of said rear wall, and a pair of opposite side walls connected to and extending perpendicular between said rear wall and said end wall, and said coupling means including a catch formed on each of said inner surfaces of each of said side walls adjacent the respective parallel rearward edges of said side walls, and a coupling edge formed on each of said side walls of said base, said coupling edges being disposed adjacent said rear wall and positioned to engage said catches of said cover by a snap-fit.

16. A conduit adapter assembly, the combination comprising:

a base attachable to a first surface and adjacent a second surface non-coplanar to the first surface;

a cover detachably coupled to said base to form an enclosure having a first and second end and a pair of opposite side walls, said side walls extending perpendicular to the first surface and having first and second end edges, said second end edges extending immediately adjacent and parallel to the second surface;

first means, formed in one of said base and said cover, for defining a first opening which communicates with the first surface to receive at least one conduit from a first run of duct lying substantially flat on the first surface; and second means, formed in one of said base and cover, for selectively defining a second opening lying in a plane substantially perpendicular to the plane of the first opening, said second opening being positioned immediately adjacent the second mounting surface and communicating with one of said second end edges of one of said opposite side walls and for receiving at least a second run of duct lying substantially flat on the second surface, said cover further including a detachable end face having said first opening formed therein, said detachable end face defining a larger opening in said cover when removed and being dimensioned to receive therein a larger size of a first run of a surface-mounted duct.

17. A conduit adapter the combination comprising:

a base attachable to a first surface;

a cover detachably coupled to said base to form an enclosure;

means, formed in one of said base and said cover, for defining a first opening to receive at least one conduit from a first run of duct mounted on the first surface; and punch-out means, formed in one of said base and cover, for receiving at least a second run of duct mounted on a second surface non-coplanar with the first surface, said cover including a detachable end face having said first opening formed therein, said detachable end face defining a second opening in said cover when removed and being dimensioned to receive therein a larger size of a first run of a surface-mounted duct, and said cover further including a front wall, two opposite side walls, and first and second ends, said detachable end wall being disposed at said first end of said cover and being, contiguously coupled with said two opposite side walls and said front wall.

18. A conduit adapter assembly according to claim 17, wherein said two opposite side walls and said front wall have contiguous rounded first end edges, and said detachable end wall has a rounded peripheral edge converging inwardly with said rounded first end edges of said side walls and of said front wall to form a first frangible seam therebetween.

19. A conduit adapter assembly according to claim 18, wherein said two opposite side walls and said front wall have contiguous second end edges, and said two opposite side walls have parallel rearward edges, said rearward edge and said second end edges of each of said side walls converge to form a corner.

20. A conduit adapter assembly according to claim 19, wherein said punch-out means includes a second frangible seam disposed on one of said two opposite side walls and extends between said rearward edge and said second end edge of said one of said side walls to define a first twist-out portion.

21. A conduit adapter assembly according to claim 20, wherein said punch-out means includes a third frangible seam disposed on the other of said two opposite side walls and extends between said rearward edge and said second end edge of the other of said side walls to define a second twist-out portion.

22. A conduit adapter assembly according to claim 19, wherein said punch-out means includes second and third frangible seams disposed, respectively, on said two opposite side walls, each of said second and third frangible seams extends between said rearward edge and said second end edge of each of said opposite side walls to define, respectively, first and second twist-out portions.

23. A conduit adapter assembly according to claim 22, wherein said two opposite side walls and said front wall have inner and outer surfaces, each of said second and third frangible seams being defined by a groove formed in said inner surfaces of said side walls, respectively.

24. A conduit adapter assembly according to claim 22, wherein said first twist-out portion is dimensioned to receive at least one conduit therein from a second run of a surface-mounted duct.

25. A conduit adapter assembly according to claim 24, wherein said second twist-out portion is dimensioned to receive at least one conduit therein from a third run of a surface-mounted duct.

26. A conduit adapter assembly, the combination comprising:

a base attachable to a first surface and adjacent a second surface non-coplanar to the first surface;

a cover detachably coupled to said base to form an enclosure having a first and second end and a pair of opposite side walls, said side walls extending perpendicular to the first surface and having first and second end edges, said second end edges extending immediately adjacent and parallel to the second surface;

first means, formed in one of said base and said cover, for defining a first opening which communicates with the first surface to receive at least one conduit from a first run of duct lying substantially flat on the first surface; and second means, formed in one of said base and cover, for selectively defining a second opening lying in a plane substantially perpendicular to the plane of the first opening, said second opening being positioned immediately adjacent the second mounting surface and communicating with one of said second end edges of one of said opposite sides and for receiving at least a second run of duct lying substantially flat on the second surface, said base further including a rear wall having a first end and a second end with an end wall disposed at said second end of said rear wall, and said second means having at least one punch-out formed in one of said rear and end walls of said base.

27. A conduit adapter assembly according to claim 26, wherein said at least one punch-out includes, a first punch-out disposed in said rear wall of said base and a second punch-out disposed in said end wall of said base.

28. A conduit adapter assembly the combination comprising:

a base attachable to a first surface;

a cover detachably coupled to said base to form an enclosure;

means, formed in one of said base and said cover, for defining a first opening to receive at least one conduit from a first run of duct mounted on the first surface; and punch-out means, formed in one of said base and cover, for receiving at least a second run of duct mounted on a second surface non-coplanar with the first surface, said cover having a front wall having first and second ends, and two opposite side walls, each of said side walls having inner and outer surfaces, a parallel rearward edge, and a catch formed on said inner surface near said parallel rearward edge, and said base having a rear wall having first and second ends, an end wall disposed at said second end of said rear wall, and a pair of opposite side walls connected to and extending substantially perpendicular from said rear wall and said end wall, each of said side walls of said base having a coupling edge disposed adjacent said rear wall and positioned to engage said catches by a snap-fit.

29. A conduit adapter assembly, the combination comprising:

a base having a rear wall adapted to be fixedly coupled to a first mounting surface and adjacent a second mounting surface non-coplanar to the first surface;

a cover adapted to be coupled to said base, said cover including a front wall with a pair of side edges and a pair of end edges, a pair of substantially parallel side walls having a pair of end edges and a pair of side edges with one of said side edges of each of said side walls being coupled to and extending from one of said side edges of said front wall, and an end wall coupled to one of said end edges of said front wall and one of said edges of each of said side walls, at least one of said side walls having a frangible means, extending between its other side edge and its other end edge, for selectively removing a corner formed by said other side and end edges to receive at least one conduit from a duct mounted on one of the mounting surface; and coupling means, associated with said cover and said base, for coupling said cover to said base to form an enclosure.

30. A conduit adapter assembly according to claim 29, further comprising a frangible means, disposed on the other of said side walls of said cover and extending between its other side edge and its other end edge, for selectively removing a corner formed by said other side and end edges to receive at least one conduit from a duct mounted on one of the mounting surfaces.

31. A conduit adapter assembly according to claim 29, wherein said cover and said base being formed of a resilient plastic material.

32. A conduit adapter assembly according to claim 29, wherein said end wall of said cover having a first opening therein, and being detachable from said cover to form a second larger opening dimensioned to receive a larger size run of duct therein when detached.

33. A conduit adapter assembly according to claim 32, wherein said end edges of said side and front walls, which are coupled to said detachable end wall, have contiguous rounded end edges, and said detachable end wall has a rounded peripheral edge converging inwardly with said rounded end edges of said front and side walls to form a frangible seam between said detachable end wall and said cover.

34. A conduit adapter assembly, the combination comprising:

a base adapted to be fixedly coupled to a first surface and adjacent a second surface non-coplanar to the first surface;

a cover adapted to be coupled to said base, said cover including a front wall with a pair of side edges and a pair of end edges, a pair of substantially parallel side walls having a pair of end edges and a pair of side edges with one of said side edges of each of said side walls coupled to and extending from one of said side edges of said front wall, and an end wall with frangible means for detachable coupling said end wall to one of said end edges of said front wall and one of said end edges of each of said side walls, said end wall having a first opening therein and coupling means, associated with said cover and said base, for coupling said cover to said base to form an enclosure having first and second opposite ends and a pair of opposite side walls extending between said first and second opposite ends.

35. A conduit adapter assembly according to claim 34, wherein said cover and said base being formed of a resilient plastic material.

36. A conduit adapter assembly according to claim 35, wherein
said end edges of side walls and of said front wall, which are coupled to said end walls, are contiguous rounded end edges, and
said detachable end wall has a rounded peripheral edge converging inwardly with said rounded end edges of said front and side walls to form a said frangible means between said detachable end wall and said cover.

37. A conduit adapter assembly according to claim 36, wherein
said detachable end wall defining a second opening in said cover when removed and being dimensioned to receive therein a larger size of a first run of a surface-mounted duct.

38. A conduit adapter assembly according to claim 37, further comprising
a frangible seam disposed on one of side walls of said cover, and extending between said side edge and said end edge of said one of said side walls to define a first twist-out portion.

39. A conduit adapter assembly according to claim 34, further comprising
a frangible seam disposed on the other of said side walls of said cover, and extending between said side edge and said end edge of said other of said side walls to define a second twist-out portion.

* * * * *